United States Patent

Aoki et al.

[11] 3,897,978
[45] Aug. 5, 1975

[54] METHOD AND DEVICE FOR HIGH CONCENTRATE PNEUMATIC CONVEYING OF POWDER OR GRANULAR MATERIAL

[75] Inventors: Ryuichi Aoki, Yokohama; Noboru Kawakami, Tokyo, both of Japan

[73] Assignee: Fuji Paudal Kabushiki Kaisha, Osaka, Japan

[22] Filed: Aug. 3, 1973

[21] Appl. No.: 385,562

[30] Foreign Application Priority Data
Aug. 10, 1972 Japan .............................. 47-80608
Dec. 12, 1972 Japan .............................. 47-124870

[52] U.S. Cl. ...................... 302/56; 302/53; 302/58
[51] Int. Cl.² ........................................... B65G 53/40
[58] Field of Search ....... 302/26, 33, 40, 41, 53–56, 302/58, 66; 417/240, 900

[56] References Cited
UNITED STATES PATENTS

| | | | |
|---|---|---|---|
| 1,749,817 | 3/1930 | Hermsdorf | 302/56 X |
| 2,433,726 | 12/1947 | Angell | 302/53 X |
| 2,644,725 | 7/1953 | Doull et al. | 302/50 |
| 2,818,200 | 12/1957 | Webb et al. | 302/56 X |
| 3,062,589 | 11/1962 | Hawkinson et al. | 302/56 |
| 3,223,456 | 12/1965 | Sonnenschein | 302/53 X |
| 3,314,731 | 4/1967 | Kopineck et al. | 302/56 X |
| 3,463,120 | 8/1969 | Wallis | 118/626 |
| 3,542,436 | 11/1970 | Wallis et al. | 302/56 |

*Primary Examiner*—Evon C. Blunk
*Assistant Examiner*—Jeffrey V. Nase
*Attorney, Agent, or Firm*—Holman & Stern

[57] ABSTRACT

A device for high concentrate pneumatic conveying of a granular material comprising a vessel containing the material, a conveyor duct having its lower end placed in the material within the vessel and a material discharge portion at the other end thereof, an air inlet provided in a lower portion of the vessel for introducing air into a layer of the material within the vessel, and oscillating means for giving the material at the bottom of the vessel an upward and downward reciprocal motion.

2 Claims, 13 Drawing Figures

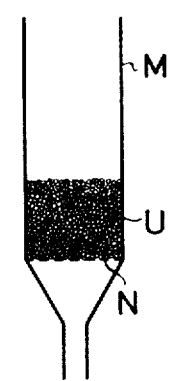
Fig. 1a
PRIOR ART
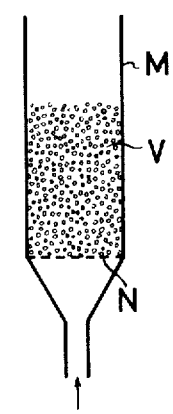
Fig. 1b
PRIOR ART
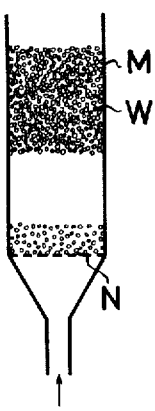
Fig. 1c
PRIOR ART
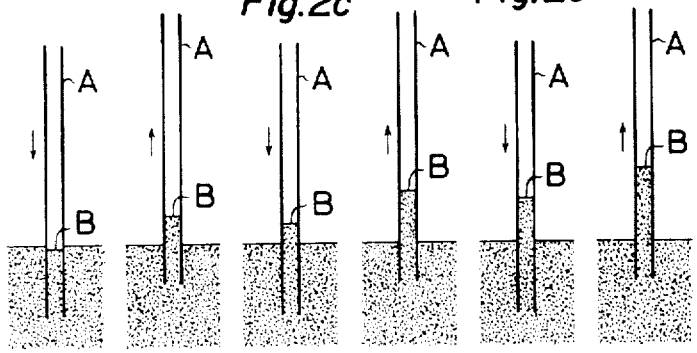
Fig. 2a Fig. 2b Fig. 2c Fig. 2d Fig. 2e Fig. 2f

METHOD AND DEVICE FOR HIGH CONCENTRATE PNEUMATIC CONVEYING OF POWDER OR GRANULAR MATERIAL

BACKGROUND OF THE INVENTION

Pneumatic conveyors for powder and granular materials are extensively used in the cement industry, milling industry and various chemical industries handling powders and granules and have the advantages of being 1. easy to operate continuously and automatically with good controllability, and
2. operable in a sealed system to assure a safe and clean operation.

Because of these and other advantages, pneumatic conveyors are expected to find a wider variety of applications in the future.

However, conventional pneumatic conveying methods have the following drawbacks:

1. The use of a large amount of air or gas entails a greater power requirement than other mechanical conveyors.
2. Particles or granules in suspension are entrained by an airstream at a fairly high velocity in the direction of the stream while impinging on the duct wall, so that the consequent impact or friction crushes and abrades the particles or granules, causing marked abrasion of the wall of the duct especially at bent portions.

Accordingly, researches have heretofore been conducted on a high concentrate pneumatic conveying method in which the ratio of the weight of powder or granular material to the flow rate of air is increased to lower the velocity of the material relative to that of the fluid. For a stable operation, however, this ratio is presently limited to a ratio of about 50 to 60 kg. of the material per cubic meter of air.

Basically, high concentrate pneumatic conveying has heretofore been conducted by so-called "blow tank" system wherein compressed air is introduced into a vessel containing a powder to force out the powder for transport.

Ideally, the high concentrate pneumatic transport is such that a layer of particles packed in a conveyor duct is moved toward the direction of transport neumatically while permitting the particles to retain the form of the layer. Although partially, this may be nearly achieved by slugging in a vertical lift duct but with slugging a stable operation is available only within a very limited range, it being still impossible to achieve a noticeable increase in the amount of the particles relative to the amount of air. In fact, the operation involves marked variations in pressure and is therefore unstable and practically infeasible.

The slugging referred to above will be described in detail with reference to FIG. 1 schematically showing a fluidized layer. A vessel M is provided at its lower portion with an apertured plate N for introducing air. FIG. 1(a) shows a layer U of tightly packed particles or granules on the apertured plate, FIG. 1(b) shows a layer V of the particles or granules which is fluidized by an airstream admitted from the lower portion at a certain flow rate, and FIG. 1(c) shows the state in which slugging takes place within the vessel M to push up a mass of the particles or granules in the form of a layer W supported by virtue of friction with the wall of the vessel.

The prior art in this field is disclosed in Publication of Japanese Utility Model application No. 6670/1968 and in Publication of Japanese Pat. application No. 21252/1969.

SUMMARY OF THE INVENTION

This invention relates to a device for high concentrate conveying of granular materials, more particularly to a novel device for pneumatically conveying granular materials at a high concentration almost in a heaped state.

An object of this invention is to provide a device for conveying granular materials of high density through a conveyor duct by air or gas pressure in a stretching rod form under constant conditions.

Another object of this invention is to provide a device for conveying granules at a low velocity so that the granules will not be crushed or abraded.

Another object of this invention is to provide a device for conveying granular materials using a very small amount of air or gas so that the materials can be transported by using an inert gas depending upon their chemical properties.

According to this invention, a granular material in a vessel is given, at the inlet of a conveyor duct extending from the vessel, a reciprocal motion relative to the conveyor duct. An airstream flowing through the duct produces a continuous heaped flow of the material to move the same through the conveyor duct at an almost ideal uniform density.

The present invention has the following advantages:

1. Transport at a high concentration and a low velocity renders the granules free from crushing and abrasion due to collision.
2. The bag filter or like separator used in conventional pneumatic conveying systems for separating the conveyed granular material from air can be replaced by a simple air release tube or a separator which requires only a very small space inasmuch as a small amount of air is used in this invention.
3. The low rate of airstream lowers power cost.
4. The present and device is applicable to all sorts of granular materials and are therefore usable in a wide variety of industries.

BRIEF DESCRIPTION OF THE DRAWINGS

FIGS. 1(a) to (c) are a diagram schematically showing the flow of a granular material produced by an upward airstream within a vessel;

FIGS. 2(a) to (f) are diagrams showing the principle of the method of this invention for conveying a granular material;

DESCRIPTION OF THE PREFERRED EMBODIMENTS

Figure 3:
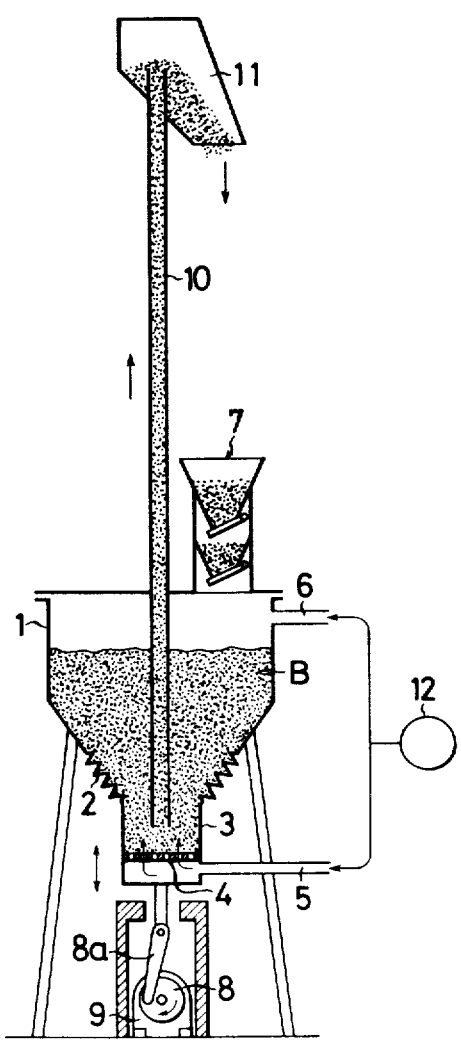
FIG. 3 is a front view schematically showing an embodiment of the device according to this invention.

This invention provides a device for high concentrate pneumatic conveying of a granular material characterized by introducing an amount of air into a layer of the material in which the lower end of a conveyor duct is placed, giving the material an upward and downward reciprocal motion relative to the conveyor duct, producing an airstream flowing through the conveyor duct in the direction of transport, and forming a continuous heaped flow of the material within the conveyor duct to convey the material.

This invention further provides a device for high concentrate pneumatic conveying of a granular material comprising a vessel containing the material, a conveyor duct having its lower end placed in the material within the vessel and a material discharge portion at the other end thereof, means for introducing pressure air into the material within the vessel, and oscillating means for giving the material an upward and downward reciprocal motion relative to the conveyor duct.

This invention further provides a device for high concentrate pneumatic conveying of a granular material comprising a tank for containing the material, a conveyor duct having its lower end placed in the tank main body and a material discharge portion at the other end thereof, a diaphragm sealingly provided at a lower portion of the tank main body, means provided for the diaphragm to give the same an upward and downward reciprocal motion relative to the conveyor duct, and means for introducing an amount of air into the material in the vicinity of the lower end of the conveyor duct.

FIG. 2 shows the principle of the method of this invention. A conveyor duct A has a lower end inserted into a heaped layer of granular material and a vacuum interior to produce a drawing force. When the duct A is moved up and down reciprocally, the material moves upward progressively. It is seen from FIG. 2(a) and FIG. 2(b) that when the duct A is moved up, the material B within the duct moves up along the inner wall of the duct A, following the movememt of the duct.

Subsequently, if the duct A is lowered, the material B within the duct does not rise but an additional amount of the material enters the duct as shown in FIG. 2(c). As the duct A rises as seen in FIG. 2(d), the material also goes up. Through further repetition of such procedure as illustrated in FIG. 2(e) and FIG. 2(f), the material B within the duct is progresively sent upward. It is considered that the negative pressure within the duct and the air present among the granules of the material in the vicinity of the lower end of the duct A act to force up the material B through the duct A.

Based on the principle described above, the conveyor duct and a heap of granular material are subjected to an upward and downward reciprocal motion relative to each other according to this invention so as to convey the material through the duct. In the foregoing method of this invention, the material moving through the duct has a density that is uniform throughout the duct and is much higher than in conventional pneumatic conveying methods.

This invention will be described below in greater detail with reference to embodiments.

FIG. 3 shows a vessel 1 for containing a granular material having a tubular lower portion 3 of a reduced diameter. The lower portion 3 has a bottom equipped with a plate 4 formed with many apertures and an upper portion which is connected to a flexible wall 2 continuous with the vessel 1. By the provision of the flexible wall 2, the lower portion 3 is rendered movable up and down with respect to the vessel 1. The vessel 1 has an inlet 7 of double damper type for charging the material.

At the center of the sealed vessel 1 there is disposed a vertical conveyor duct 10 having at its distal end an outlet 11 for discharging the material. The vessel 1 has an air inlet 6 for supplying compressed air from a compressor 12. The vessel 1, material outlet 11, conveyor duct 10 and material inlet 7 are held stationary.

Positioned under the apertured plate 4 in the tubular lower portion 3 is an air inlet 5 for supplying compressed air from the compressor 12. A crank mechanism 8 and a motor 9 rotatable at a low variable speed are linked by an arm 8a to the bottom of the lower portion 3. By adjusting the number of revolutions of the motor and the length of the crank, the crank mechanism 8 determines the number and stroke of up-and-down movements of the lower portion 3 in accordance with the properties of the granular material.

The material to be conveyed is stored in the interior of the sealed vessel 1, flexible wall 2 and lower portion 3 as seen in FIG. 3.

When driven, the motor 9 operates the crank mechanism 8 to move the lower portion 3 up and down reciprocally.

The compressor 12 supplies compressed air to the interior of the device through the air inlets 5 and 6. The air admitted through the air inlet 5 passes through the apertured plate 4 into the material B within the lower portion 3 to fluidize the material in the vicinity of the apertured plate 4 where the lower end of the conveyor duct 10 is positioned. Because the lower portion 3 moves up and down reciprocally, the granular material within the lower portion 3 behaves in the same manner as shown in FIG. 2(a) to (f) to enter the conveyor duct 10 and moves upward within the duct 10 easily and smmothly.

Experiments using a transparent plastic conveyor duct have revealed that the ratio of the granular material to the airstream supplied by the compressor 12 is very high, giving a rodlike mass filling the duct and moving upward at a low velocity in a stable fashion, with a small amount of air uniformly mixed therewith but without permitting the movement of the individual granules.

It will be readily understood that in the embodiment of FIG. 3 the upward and downward motion of the lower portion 3 relative to the stationary duct 10 is substituted for the up-and-down movement of the duct relative to the granular material of FIG. 2 and that the pressure air, used in place of the vacuum in the duct 10, pushes up the material.

Figure 4:
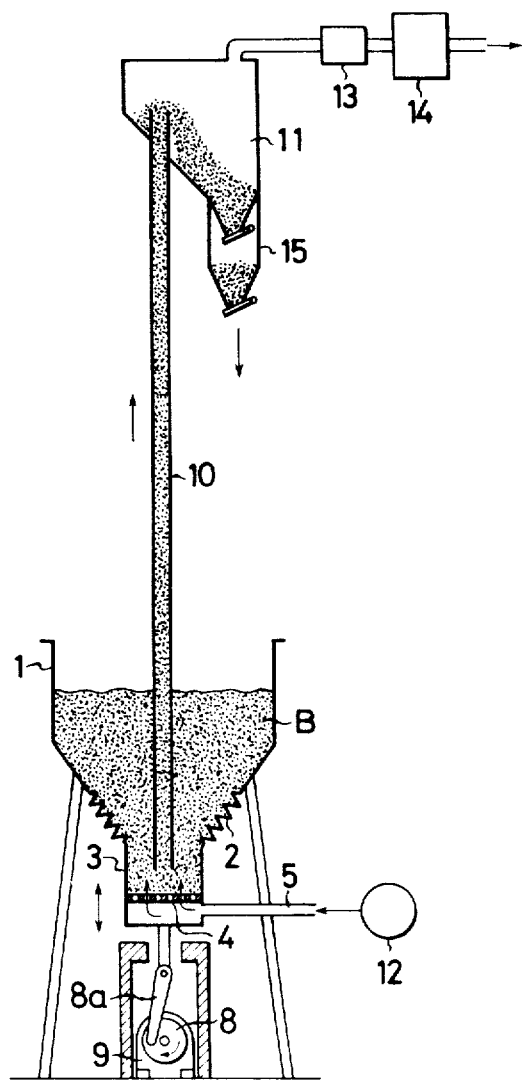
FIG. 4 is a front view showing a modified embodiment.

FIG. 4 shows an embodiment wherein a vacuum pump 14 draws air from the interior of the conveyor duct 10. Reference numerals 1, 2, 3, 4, 5, 8, 8a, 9 and 12 indicate the same members as in FIG. 3.

The conveyor duct 10 is provided at its distal end with means 11 for discharging the material. The conveyed material is run off from the device through a discharger 15 of the double damper type. The vacuum pump 14 equipped with a filter 13 and disposed behind the discharging means 11 draws air from the interior of the duct 10 to produce an airstream flowing through the duct 10. As in FIG. 3, air is supplied through the apertured plate 4 to fluidize the granular material in the vicinity of the lower end of the duct 10. The material B within the lower portion 3 behaves in the same manner as in FIG. 3 when entering the conveyor duct 10 from its lower end.

It was considered that the relative motion between the mass of the material and the lower end of the conveyor duct was subject to resistance, so that the lower portion 3 was moved up and down reciprocally, with the granular material rendered almost fluidized by the air forced into the lower portion 3. However, the results of experiments have indicated that it is not necessarily required to render the material nearly fluidized in the lower portion 3 but that the insertion of the conveyor duct can be effected free of resistance if some amount of air is introduced into the mass of the material through the apertured plate 4 while the lower portion 3 is being moved up and down.

It has also been found that the amount of air admitted through the apertured plate 4 need only be such that a specified ratio be maintained between the amounts of the powder or granular material and air as required for conveying the material in the form of a continuous rod-like mass contemplated by this invention.

To produce a relative reciprocal motion between the conveyor duct and the material, the conveyor duct may be moved up and down reciprocally, but it is practically more advantageous that the lower portion 3 of the vessel 1 surrounding the inlet of the duct be moved up and down reciprocally by the crank mechanism.

The air supplied through the apertured plate is effective to fluidize the granular material and to prevent blocking by a bridged mass of the material formed within the vessel 1.

Using a device as shown in FIG. 3, an experiment was conducted according to this invention as given below.

Experiment I

| Material conveyed | mixture of talc and bentonite, 3 mm in granule size |
|---|---|
| Apparent specific gravity | 0.8 kg/l |
| Pressure within vessel | 0.2 kg/cm$^2$ |
| Air flow rate within duct | 1.8 m$^3$/hr |
| Diameter of duct | 25.4 mm |
| Conveying distance | 3 m in height |
| Number of strokes of apertured plate | 315/min |
| Length of stroke of apertured plate | 30 mm |
| Conveying capacity | 92 kg/hr |

Figure 5:
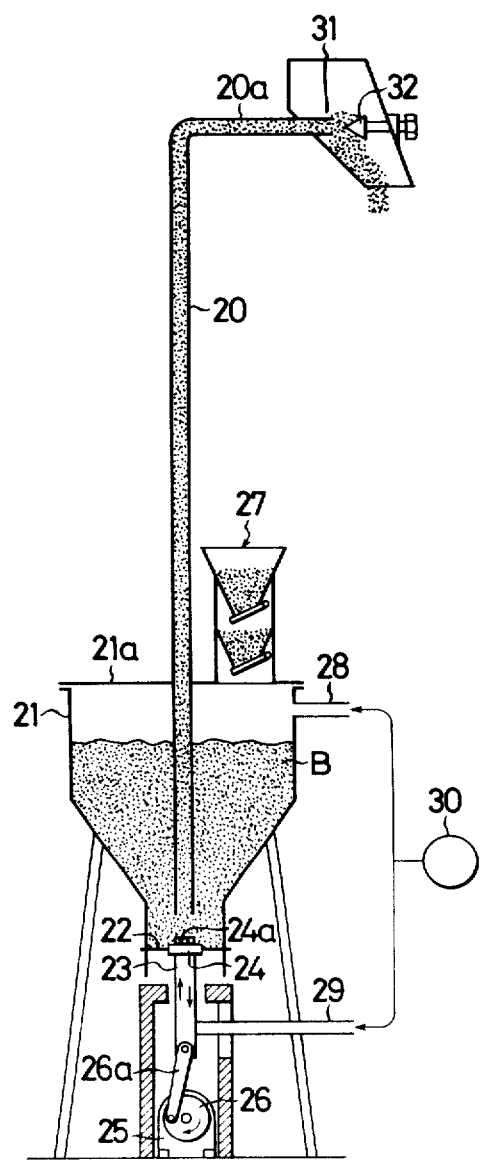
FIG. 5 is a front view showing a modified vessel.
Figure 6:
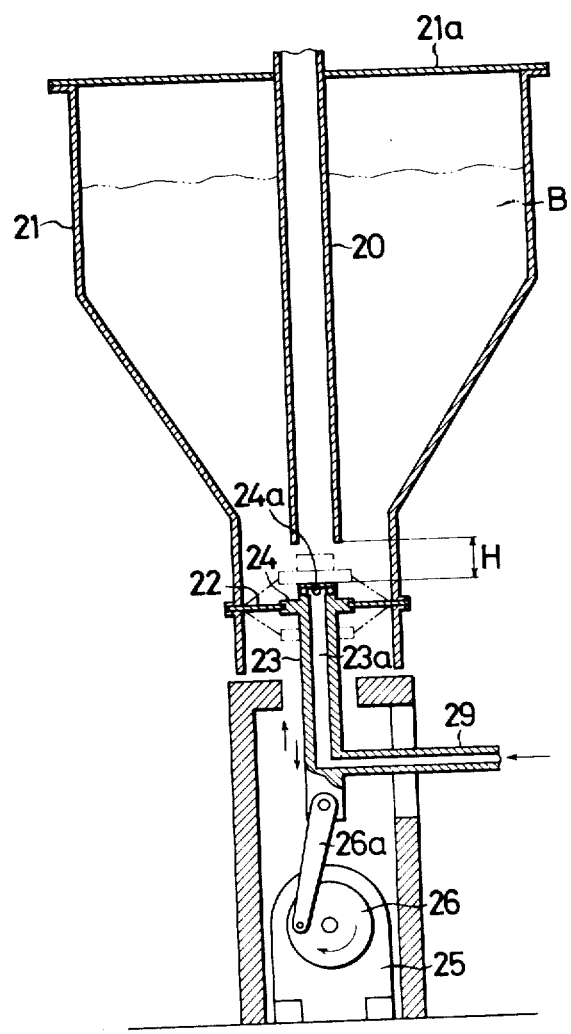
FIG. 6 is an enlarged view in section showing the same.

FIGS. 5 and 6 show a modified conveyor duct, a modified mechanism for giving vibration to a granular material in the vicinity of inlet of the duct and control means disposed at the outlet of the duct.

A disphragm 22 is sealingly provided at a lower portion of a sealed vessel 21 for containing a granular material B. Attached to the center of the disphragm 22 is a flange 24 at one end of a pipe or air feeder 23 serving also as an oscillator. A motor 25 rotatable at a low variable speed is provided with a crank mechanism 26 having an arm 26a which is connected to the other end of the pipe 23. The motor 25 operates to move the pipe 23 up and down reciprocally. As shown in FIG. 6, the air supply passage 23a of the pipe 23 communicates with a number of apertures 24a formed in the peripheral wall of the pipe 23 at its upper end. Indicated at 27 is an inlet of the double damper type provided at an upper portion of the vessel 21 for charging the granular material B into the vessel, at 28 an air inlet formed in an upper peripheral wall of the vessel 21, and at 29 an air inlet communicating with the air supply passage 23a of the pipe 23. A compressor 30 supplies compressed air to the air inlets 28 and 29. A conveyor duct 20 has a lower end extending vertically into the material in the vessel 21 centrally thereof. The duct 20 includes at its upper portion a horizontal conveyor passage 20a having at its distal end an outlet 31 for discharging the material. The opening of the outlet 31 is controlled by throttle valve means 32 to control the amount of the material B to be discharged.

As in the embodiment of FIG. 3, the material B to be conveyed is stored in the sealed vessel 21. The motor 25 is operated to cause the crank mechanism 26 to move the pipe 23 up and down reciprocally through the arm 26a of the mechanism. The number and stroke of the upward and downward movements of the pipe 23 can be determined in accordance with the physical properties of the material to be conveyed.

The compressor 30 supplies compressed air to the air inlet 29 of the pipe 23 and to the air inlet 28 of the vessel 21. The air admitted from the air inlet 29 is passed through the air supply passage 23a of the pipe 23, then through the plurality of apertures 24a at the end of the pipe 23 opposing the lower end of the conveyor duct 20 and is forced into the granular material B in the lower portion of the vessel 21, whereby the material in this portion is almost fluidized. Inasmuch as the lower end of the conveyor duct 20 is positioned within the fluidized layer and the pipe 23 is moved up and down reciprocally to move the diaphragm 22 sealingly provided at the lower portion of the vessel 21, the fluidized material flows into the conveyor duct 20 easily and smoothly in the form of a heaped mass as already described.

Experiments conducted by using a transparent plastic conveyor duct have shown that the material moves upward gently through the duct in the form of a rod at a very high ratio to the amount of air supplied, with some air uniformly incorporated in the material but without permitting the movement of the individual granules. Thus the material ascends at a low velocity and moves further into the horizontal conveyor passage 20a.

Experiments were conducted using the device of FIG. 5 as set forth below.

Experiment II

| Material conveyed | Spherical granules of 90% lactose shaped with starch, 2 to 3 mm in diameter |
|---|---|
| Apparent specific gravity | 0.78 kg/l |
| Pressure within vessel | 1.1 kg/cm$^2$ |
| Air flow rate | 7 m$^3$/hr |
| Diameter of duct | 53 mm |
| Conveying distance | 5.6 m, vertical 0.4 m, horizontal |
| Number of strokes of diaphragm | 300/min |
| Length of stroke of diaphragm | 30 mm |
| Value of H (FIG. 6) | 60 mm |
| Conveying capacity | 710 kg/hr |
| Flow velocity within duct | 10 cm/sec |

Experiment III

| Material conveyed | Millet grains (feed), about 1.5 mm in size |
|---|---|
| Apparent specific gravity | 0.85 kg/l |
| Pressure within vessel | 2.9 kg/cm$^2$ |
| Air flow rate | 21.2 m$^3$/hr |
| Diameter of duct | 53.0 mm |
| Conveying distance | 7 m, vertical 1 m, horizontal |
| Number of strokes of diaphragm | 300/min |
| Length of stroke of diaphragm | 30 mm |

Experiment II-Continued

| Amount conveyed | 758 kg/hr |
|---|---|
| Flow velocity within duct | 11.3 cm/sec |

Description will now be given to the initial stage of a conveying operation using the embodiment of FIG. 5 wherein the conveyor duct includes the horizontal conveyor passage 20a. The granular material moves upward from the interior of the vessel 21 through the duct 20 in such manner that the top portion of the material within the duct is kept in suspension in the air or in slugging state in which part of the interior of duct is filled only with air, inasmuch as at the initial stage air almost fills up the interior of the duct 20. At this time, the outlet opening of the horizontal conveyor passage 20a is reduced by the throttle valve means 32 to discharge air alone from the duct and to retain the material within the duct by the valve 32. This reduces the amount of air within the duct, permitting the material to accumulate progressively until it fills up the horizontal passage 20a, with the result that the material is conveyed in a uniformly heaped state through the entire length of the duct.

Since the material can be transported through the horizontal passage 20a as already described, the conveyor duct need not necessarily be vertical but may include a slanting or bent protion.

According to this invention, the vibration given to one of the granular material and the outlet of the conveyor duct relative to the other makes it possible to convey the material through the duct in a packed state. It has also been ascertained that, in addition to the transport of material in the form of a continuous massed flow, the vibration when controlled permits intermittent transport in which masses of granular material of a constant amount spaced by air at a definite pitch are moved one after another through the duct.

The intermittent transport effected in the abovementioned mode can be applied directly to an operation to divide a great amount of granular material into fractions or to an operation to feed a constant amount of material at a constant time interval.

This invention is not limited to the embodiments given above. For instance, the air inlet 28 in FIG. 5 can be eliminated, and various other alterations and modifications will be provided within the scope of this invention.

What is claimed is:

1. A device for high concentrate conveying of a granular material comprising in combination: a closed hopper type container means for containing the material to be conveyed; a material inlet means with a double damper connected to the top of the container means; a conveyor duct having an axis and an equalized diameter lower end opening to be positioned in the lowest portion of the material placed in the container means, the duct extending through the container means to an upper portion thereof; an oscillating means comprising means linked to a movable bottom portion movably connected to the upper half portion of the container means for imparting relative reciprocating movement between the material and duct and giving the material in the vicinity of the opening a reciprocating motion in the same direction as the axis of the conveyor ducts; and air supplying means for supplying a small amount of air to the material comprising a plate disposed in the movable bottom portion and formed with a number of apertures having a smaller diameter than the granules of the material and a gas supply pipe for supplying a gas from outside the plate therethrough, whereby there is produced a rodlike stream of the material within the conveyor duct in the direction of transport.

2. A device for high concentrate pneumatic conveying of a granular material comprising container means for containing the material to be conveyed, a conveyor duct having a lower end opening to be positioned in the lowest portion of the material placed in the container means, means for giving the material in the vicinity of the opening a reciprocal motion in the same directions as the axis of the conveyor duct, means for supplying a small amount of air to the material in the vicinity of the opening, and means for producing a stream within the conveyor duct in the direction of transport of the material, the means for giving a reciprocal motion comprising oscillating means linked to a movable bottom portion movably connected to the upper half portion of the container means, the air supplying means comprising a plate disposed in the movable bottom portion and formed with a number of apertures having a smaller diameter than the granules of the material and a gas supply pipe for supplying a gas from outside of the plate therethrough, the container means being a sealed container and gas supply pipes connected to the container are connected to a high pressure gas source to produce a stream within the conveyor duct in the direction of transport of the material, a throttle valve being provided for an opening of a horizontal conveyor passage of the conveyor duct.

* * * * *